United States Patent
Kim

(10) Patent No.: US 10,003,361 B2
(45) Date of Patent: Jun. 19, 2018

(54) METHOD AND APPARATUS FOR CONTROLLING ANTENNAS IN VEHICLE COMMUNICATION SYSTEM

(71) Applicant: HYUNDAI MOTOR COMPANY, Seoul (KR)

(72) Inventor: Jang Yeol Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 14/604,274

(22) Filed: Jan. 23, 2015

(65) Prior Publication Data

US 2016/0087655 A1    Mar. 24, 2016

(30) Foreign Application Priority Data

Sep. 23, 2014    (KR) .................. 10-2014-0126540

(51) Int. Cl.
*H04B 1/00*    (2006.01)
*H04W 4/04*    (2009.01)
(Continued)

(52) U.S. Cl.
CPC ............. *H04B 1/005* (2013.01); *B60R 21/00* (2013.01); *H04B 17/318* (2015.01);
(Continued)

(58) Field of Classification Search
CPC ............ B60C 23/0444; B60C 23/0418; B60C 23/045; B60C 23/0452; B60C 23/0454;
(Continued)

(56) References Cited

U.S. PATENT DOCUMENTS 7,499,691 B1    3/2009    Dunn et al.
8,781,442 B1    7/2014    Link, II
(Continued)

FOREIGN PATENT DOCUMENTS

JP    09214234 A    8/1997
JP    11251982 A    9/1999
(Continued)

OTHER PUBLICATIONS

Korean Office Action issued in Korean Application No. 10-2014-0126540, dated Jun. 22, 2015.
(Continued)

*Primary Examiner* — Kwasi Karikari
(74) *Attorney, Agent, or Firm* — McDermott Will & Emery LLP

(57) ABSTRACT

A method for controlling antennas in a vehicle having an external antenna and an internal antenna includes triggering an eCall service function upon sensing an accident occurrence event, measuring a quality of one or more wireless signals received through the external antenna, comparing the measured quality of the wireless signals with a reference quality value, and selecting one of the external antenna and the internal antenna to be used in the eCall service function based on the results of the step of comparing the measured quality of the wireless signals with the reference quality value. A system of emergency communication of a vehicle is also provided.

11 Claims, 5 Drawing Sheets

(51) Int. Cl.
  *H04B 17/318* (2015.01)
  *H04B 17/336* (2015.01)
  *B60R 21/00* (2006.01)

(52) U.S. Cl.
  CPC .......... *H04B 17/336* (2015.01); *H04W 4/046* (2013.01); *H04W 4/90* (2018.02); *B60R 2021/0027* (2013.01)

(58) Field of Classification Search
  CPC ..... H04W 24/10; H04W 16/18; H04W 24/06; H04L 49/557; H04L 63/08; H04L 63/1425; H04L 9/3271; H04B 1/3822; H04B 7/26
  See application file for complete search history.

(56) References Cited

U.S. PATENT DOCUMENTS

| | | | | |
|---|---|---|---|---|
| 2009/0270059 A1* | 10/2009 | Bally | ............... | H04B 7/0814 455/277.1 |
| 2010/0164790 A1* | 7/2010 | Wisnewski | .......... | H01Q 1/3208 455/67.11 |
| 2011/0153118 A1* | 6/2011 | Lim | ................. | H04M 1/72533 701/2 |
| 2012/0258705 A1* | 10/2012 | Wisnewski | .......... | H04W 4/046 455/423 |

FOREIGN PATENT DOCUMENTS

| | | |
|---|---|---|
| JP | 3170972 B2 | 5/2001 |
| JP | 2001-213269 A | 8/2001 |
| JP | 2001338377 A | 12/2001 |
| JP | 2004123055 A | 4/2004 |
| KR | 10-1997-0049942 A | 7/1997 |
| KR | 10-2004-0035009 A | 4/2004 |
| KR | 10-2005-0088864 A | 9/2005 |
| WO | 97/36187 A1 | 10/1997 |

OTHER PUBLICATIONS

Korean Notice of Allowance dated Dec. 28, 2015 issued in Korean Patent Application No. 10-2014-0126540.
Partial European Search Report dated Feb. 12, 2016 issued in European Patent Application No. 15161058.1.
Extended European Search Report dated Jun. 22, 2016 issued in European Patent Application No. 15161058.1.

* cited by examiner

METHOD AND APPARATUS FOR CONTROLLING ANTENNAS IN VEHICLE COMMUNICATION SYSTEM

This application claims the benefit of priority to Korean Patent Application No. 10-2014-0126540, filed on Sep. 23, 2014, which is hereby incorporated by reference as if fully set forth herein.

TECHNICAL FIELD

The present inventive concept relates to a method for controlling antennas in a vehicle communication system, and more particularly, to a method for controlling antennas in which an emergency call service is more rapidly and safely provided by selecting an optimum antenna through self-diagnosis when various emergencies occur in a vehicle equipped with an automatic emergency call system, and an apparatus therefor.

BACKGROUND

Recent rapid development of information technologies affects the automobile industry, and various information technologies are incorporated into vehicles.

An automatic emergency call system (also simply called "eCall system") is an emergency call system operated when a serious traffic accident happens. When a vehicle loaded with an eCall system senses a serious accident, the vehicle transmits a designated warning message or an emergency call message to the closest vehicle from among vehicles equipped with a public safety answering point (PSA).

Therefore, an eCall function allows passengers of an accident vehicle to more rapidly receive help from other vehicles and transmits a warning message to other drivers on the road which may be affected by a corresponding accident, thus assisting in prevention of additional accidents.

Most vehicles on the market now provide a wireless communication service through external antennas. If the exterior of a vehicle is seriously damaged due to an accident, such as rollover or collision, the external antenna of the vehicle may not be normally operated. In this case, an emergency call request may be delayed and a danger of accidents of peripheral approaching vehicles may be increased.

SUMMARY OF THE INVENTION

Accordingly, the present inventive concept is directed to a method and apparatus for providing a method and apparatus for controlling antennas in a vehicle that substantially obviates one or more problems due to limitations and disadvantages of the related art.

An object of the present inventive concept is to provide a method and apparatus for controlling antennas in a vehicle equipped with an external antenna and an internal antenna.

Another object of the present inventive concept is to provide a method and apparatus for controlling antennas in a vehicle in which an optimum global positioning system (GPS) antenna is selectable through self-diagnosis of antennas equipped in the vehicles when an emergent accident occurs.

A further object of the present inventive concept is to provide a method and apparatus for controlling antennas in a vehicle in which an optimum wireless communication antenna is selectable based on a wireless reception performance when an emergent accident occurs.

Additional advantages, objects, and features of the inventive concept will be set forth in part in the description which follows and in part will become apparent to those having ordinary skill in the art upon examination of the following or may be learned from practice of the invention. The objectives and other advantages of the inventive concept may be realized and attained by the structure particularly pointed out in the written description and claims hereof as well as the appended drawings.

To achieve these objects and other advantages and in accordance with the purpose of the invention, as embodied and broadly described herein, a method for controlling antennas in a vehicle having an external antenna and an internal antenna includes triggering an eCall service function upon sensing an accident occurrence event, measuring a quality of one or more wireless signals received through the external antenna, comparing the measured quality of the wireless signals with a reference quality value, and selecting one of the external antenna and the internal antenna to be used in the eCall service function based on the results of the step of comparing the measured quality of the wireless signals with the reference quality value.

The accident occurrence event may be generated when the intensity of impact applied to the exterior of the vehicle is greater than or equal to a reference impact intensity value or more.

Further, the accident occurrence event may be generated when trouble or malfunction is sensed by an electronic controller equipped in the vehicle.

Further, the accident occurrence event may be generated when at least one air bag provided in the vehicle is deployed.

Further, the accident occurrence event may be generated when an eCall button mounted in the vehicle is pressed.

The measured quality of the one or more wireless signals may be at least one of a received signal strength indicator (RSSI), a signal to noise ratio (SNR), a bit error rate (BER), and a block error rate (BLEB) of wireless signals received from a base station of a mobile communication network.

The quality of the wireless signals may be determined by averaging values periodically measured for a unit time.

The step of selecting one of the external antenna and the internal antenna may include judging whether or not the measured quality of the wireless signals exceeds the reference quality value, selecting the internal antenna, if the measured quality of the wireless signals does not exceed the reference quality value, and selecting the external antenna, if the measured quality of the wireless signals exceeds the reference quality value.

The method may further include acquiring current position information of the vehicle through the one of the external antenna and the internal antenna selected, and the acquired current position information and vehicle information corresponding to the vehicle may be transmitted to a rescue center by a text message.

The method may further include setting a call channel for the eCall service function, the call channel connected to a rescue center, and the call channel may include at least one of a voice call channel, a video call channel, and a packet data channel.

If a black box is installed in the vehicle, an accident image stored in the black box may be transmitted to the rescue center through the call channel.

Each of the external antenna and the internal antenna may include a mobile communication antenna portion and a GPS antenna portion, and quality of the one or more wireless signals received through the mobile communication antenna portion of the external antenna may be measured.

In another aspect of the present inventive concept, a method for controlling antennas in a vehicle having an external antenna and an internal antenna is provided. The method includes receiving GPS signals through the external antenna, activating a dead reckoning (DR) mode, if normal acquisition of position information using the received GPS signals is not enabled, judging whether or not normal acquisition of position information through the external antenna is enabled during a designated first movement section, and selecting one of the external antenna and the internal antenna according to a result of the step of judging.

The method may further include judging, through a sensor circuit provided in the vehicle, whether or not the external antenna is operated normally by hardware when the DR mode normally is activated and, if the external antenna is operated normally by hardware, the step of judging whether or not normal acquisition of position information through the external antenna is enabled during the designated first movement section may be performed.

The method may further include switching from the external antenna to the internal antenna and receiving the GPS signals through the internal antenna, if the external antenna is not operated normally by hardware.

If the external antenna is not normally operated by hardware, a designated alarm signal indicating that the external antenna is not operated normally may be output.

Upon judging that normal acquisition of position information through the external antenna is disabled, the external antenna may be switched to the internal antenna and the GPS signals may be received through the internal antenna.

The method may further include judging whether or not normal acquisition of position information through the switched internal antenna is enabled during a designated second movement section and, upon judging that normal acquisition of position information through the switched internal antenna is enabled, a designated alarm signal indicating that the external antenna is not normally operated may be output.

Upon judging that normal acquisition of position information through the switched internal antenna is disabled, the internal antenna may be switched to the external antenna and the reception of the GPS signals, the activation of the DR mode, the judgment of whether or not normal acquisition of position information through the external antenna is enabled during the designated first movement section, and the switching from the external antenna to the internal antenna may be sequentially performed.

In another aspect of the present inventive concept, a system of emergency communication of a vehicle includes an external antenna including an external mobile communication antenna portion and an external GPS antenna portion, as well as an internal antenna including an internal mobile communication antenna portion and an internal GPS antenna portion. The external mobile communication antenna portion and the internal mobile communication antenna portion are connected to a mobile communication module via a first switch. The external GPS antenna portion and the internal GPS antenna portion are connected to a GPS module via a second switch. A controller is configured to sense an accident occurrence event, trigger an eCall service function, measure a quality of one or more wireless signals received through the external antenna, compare the measured quality of the wireless signals with a reference quality value, and select one of the external antenna and the internal antenna to be used in the eCall service function based on the result of the comparing.

It is to be understood that both the foregoing general description and the following detailed description of the present inventive concept are exemplary and explanatory and are intended to provide further explanation of the inventive concept as claimed.

BRIEF DESCRIPTION OF THE DRAWINGS

The accompanying drawings, which are included to provide a further understanding of the inventive concept and are incorporated in and constitute a part of this application, illustrate embodiment(s) of the inventive concept and together with the description serve to explain the principle of the inventive concept. In the drawings.

DETAILED DESCRIPTION

Reference will now be made in detail to the preferred embodiments of the present invention, examples of which are illustrated in the accompanying drawings. The suffixes "module" and "unit" in elements used in the description below are given or used together only in consideration of ease in preparation of the specification and do not have distinctive meanings or functions.

Hereinafter, although one embodiment of the present inventive concept illustrates all elements as being combined, embodiments of the present inventive concept are not limited thereto. That is, one or more elements may be selectively used within the scope of the inventive concept. Further, all the elements may be respectively implemented by independent pieces of hardware, or some of the elements of all the elements may be selectively combined and thus implemented by a computer program having a program module performing the functions of the combined elements in a plurality of pieces of hardware. Code and code segments constituting the computer program may be easily deduced by those skilled in the art. Such a computer program is stored in a computer readable storage medium and read and operated by a computer, thus being capable of implementing embodiments of the present inventive concept. The storage medium of the computer program may include a magnetic recording medium, an optical recording medium, a carrier wave medium, etc.

Further, it will be understood that the terms "including", "constituting", and "having" in the description mean that a corresponding element may be included and other elements may be further included. It will be understood that all terms including technical or scientific terms have the same meanings as generally understood by those skilled in the art. The generally used terms, such as the terms defined in a dictionary, may be interpreted as having meanings coinciding with the meanings used in the art, and may not be interpreted as having ideal or excessively formal meanings.

Further, in description of elements of the present inventive concept, the terms "first", "second", "A", "B", "(a)", "(b)", etc. may be used. These terms are used only to discriminate one element from other elements, and the nature, order, or sequence of the corresponding element is not limited by these terms. If it is stated that an element is "connected to", "combined with", or "coupled with" another element, it will be understood that the former may be directly connected to or combined with the latter or other elements may intervene between the two elements.

Figure 1:
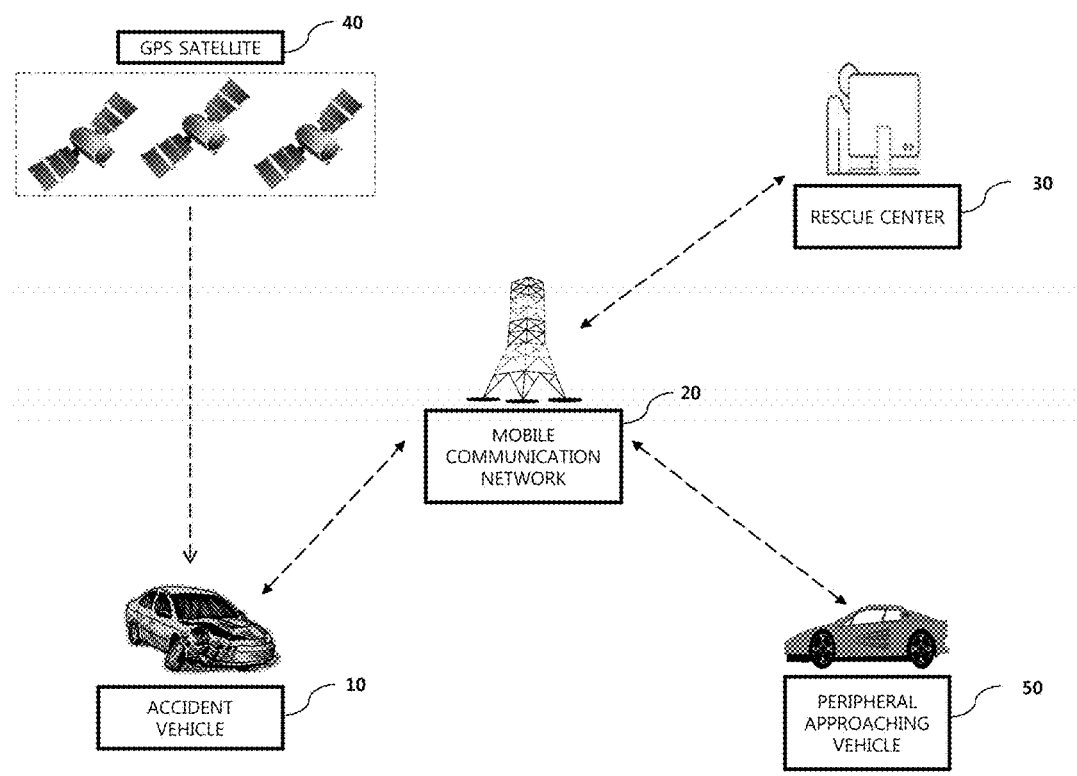
FIG. 1 is view illustrating configuration of a system for providing an automatic emergency call service in accordance with the present inventive concept.

FIG. 1 is view illustrating configuration of a system for providing an automatic emergency call service in accordance with the present inventive concept.

With reference to FIG. 1, the system for providing an automatic emergency call service includes an accident vehicle 10, a mobile communication network 20, a rescue center 30, global positioning system (GPS) satellites 40, and peripheral approaching vehicles 50.

When a vehicle accident occurs, the accident vehicle 10 may sense various accident occurrence events, such as sensing of external impact of having an intensity greater than or equal to a reference impact intensity through an impact sensor equipped therein, deployment of air bags equipped therein by external impact, or sensing malfunction of the accident vehicle 10 through various electrical control units (ECUs) or electronic controllers equipped therein, and thus judge occurrence of the accident. As another example, when a driver presses a specific position of the accident vehicle 10, for example, an eCall button mounted at a position which is most easily operated by the driver, the accident vehicle 10 may judge that an emergency or a vehicle accident occurs and generate an accident occurrence event. In certain embodiments, the eCall button may be provided at one of one side of a room mirror, one side of a handle, one side of a vehicle head unit, or any other position easily reachable by the driver of the vehicle.

When the accident vehicle 10 senses the above-described accident occurrence event, the accident vehicle 10 may trigger an eCall service function.

First, when the eCall service function is triggered, the accident vehicle 10 may measure quality of wireless signals received through an external antenna and judge whether or not the external antenna should be switched to an internal antenna by comparing the measured quality of the wireless signals with a reference quality value. For example, if the RSSI of the received wireless signals is −120 dbm or less, the accident vehicle 10 may stop use of the external antenna and measure quality of wireless signals received using the internal antenna. If the quality of the wireless signals received through the internal antenna satisfies the reference value, the accident vehicle 10 attempts an emergency call to the rescue center 30 using the internal antenna.

Further, when an antenna, which will be used in an emergency call, is determined after the eCall service function has been triggered, the accident vehicle 10 may acquire current position information using positioning signals received through the GPS satellites 40 and send a disaster rescue request including the acquired current position information and vehicle information to the rescue center 30 through the mobile communication network 20. Here, the vehicle information may include a kind of the accident vehicle 10, a vehicle number of the accident vehicle 10, driver information, etc. In certain embodiments, the disaster rescue request may be sent in the form of a text message.

In accordance with another embodiment of the present inventive concept, when the eCall service function is triggered, a voice call channel or a video call channel may be set through the mobile communication network 20 between the accident vehicle 10 and the rescue center 30 and the driver of the accident vehicle 10 may provide a rescue request to the rescue center 30 through the set voice or video call channel.

The mobile communication network 20 applied to the present inventive concept may include a GSM network, a CDMA network, a WCDMA network, or an LTE/LTE-A network.

When the rescue center 30 receives accident data from the accident vehicle 10, i.e., receives an eCall, the rescue center 10 may transmit a warning message indicating accident occurrence to the peripheral approaching vehicles 50 based on the current position information of the accident vehicle 10. Here, the warning message may include information regarding a position where the accident occurs, information regarding a traffic state around an area where the accident occurs, etc.

Further, the rescue center 30 may transmit a disaster rescue request message to a fire station, a police station, or a hospital which is determined based on the current position information of the accident vehicle 10.

Further, the rescue center 30 may identify an insurance company, which insures the corresponding accident vehicle 10, using vehicle information corresponding to the accident vehicle 10 and inform the identified insurance company of accident occurrence data.

In accordance with yet another embodiment of the present inventive concept, when the eCall service function is triggered, the accident vehicle 10 may extract an accident image stored in a black box and transmit the extracted accident image to the rescue center 30 in real time through a predetermined data communication channel.

Particularly, if the accident vehicle 10 in accordance with the present inventive concept is equipped with both the external antenna and the internal antenna, the accident vehicle 10 may have a function of adaptively switching the antennas based on the states of the external antenna and the internal antenna.

For example, when the eCall service function is triggered, the accident vehicle 10 may confirm whether or not the external antenna is damaged and attempt connection to the GPS signals and the mobile communication network 20 using the external antenna, if the external antenna is normally operated, as a result of confirmation. On the other hand, if the external antenna is damaged and is not normally operated, as a result of confirmation, the accident vehicle 10 may attempt connection to the GPS signals and the mobile communication network 20 using the internal antenna.

Here, whether or not the external antenna is normally operated may be judged based on the strength of signals received through the external antenna, for example, a received signal strength indicator (RSSI) of pilot signals received from a base station of the mobile communication network 20. That is, if the RSSI of the signals received through the external antenna exceeds a predefined reference level, the accident vehicle 10 may judge that the signals are normally received. Here, the reference level of the RSSI may be set differently according to kinds of the mobile communication network 20 to which the vehicle 10 attempts connection. That is, reference levels of the RSSI according to kinds of the mobile communication network 20 may be varied based on wireless quality criteria required according to internal standards or test data. On the other hand, if the RSSI of the signals received through the external antenna is below the predefined reference level, the accident vehicle 10 may judge that the corresponding external antenna is not in normal operation and thus attempt wireless communication using the internal antenna.

Further, whether or not the external antenna is operated normally may be determined based on whether or not positioning signals are received normally during a designated movement section. Hereinafter, a state in which positioning signals may be received normally is referred to as a 3D fixed state. Here, the 3D fixed state means a state in which latitude/longitude/altitude information may be acquired normally by decoding signals normally from the GPS satellites 40.

When the 3D fixed state is maintained during the designated movement section, the accident vehicle 10 may use the external or internal antenna which is being used now. On the other hand, when the 3D fixed state is not maintained during the designated movement section, the accident vehicle 10 may switch from the external antenna which is being used now to the internal antenna or switch from the internal antenna which is being used now to the external antenna. Therefore, the accident vehicle 10 may adaptively select an antenna which may perform optimum positioning.

In certain embodiments, the external antenna applied to the present inventive concept may be a shark antenna and a GPS antenna and a mobile communication antenna may be integrated into one shark antenna.

An external antenna in accordance with another embodiment of the present inventive concept may be a dipole antenna and a GPS antenna and a mobile communication antenna may be integrated into one dipole antenna, but embodiments of the present inventive concept are not limited thereto.

Hereinafter, with reference to subsequent drawings, a vehicle antenna diagnosis algorithm for providing an eCall service in the system for providing an automatic emergency call service in accordance with the present inventive concept will be described in detail.

Figure 2:
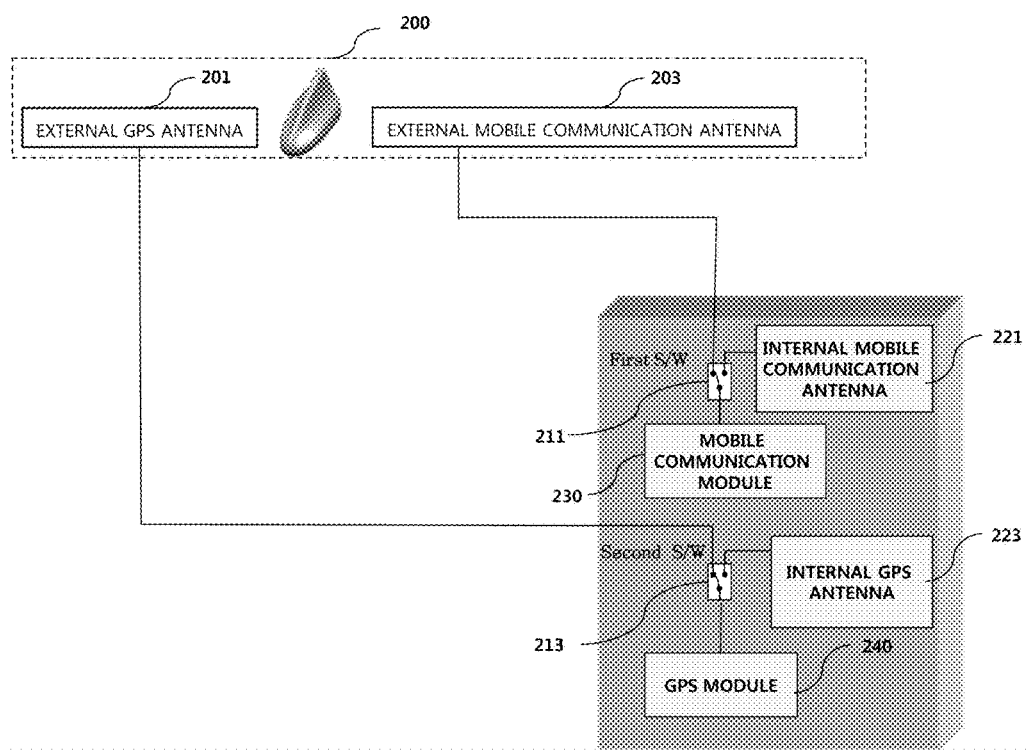
FIG. 2 is a view illustrating antenna connection in a vehicle in accordance with one embodiment of the present inventive concept.

FIG. 2 is a view illustrating antenna connection in a vehicle in accordance with one embodiment of the present invention.

With reference to FIG. 2, an external antenna 200 provided at the outside of a vehicle in accordance with the present inventive concept may include an external GPS antenna 201 for receiving GPS satellite signals and an external mobile communication antenna 203 for receiving/transmitting mobile communication signals.

The external mobile communication antenna 203 may be connected to a mobile communication module 230 through a first switch 211 and the external GPS antenna 201 may be connected to a GPS module 240 through a second switch 213.

An internal mobile communication antenna 221 and an internal GPS antenna 223 may be mounted inside the vehicle. The internal mobile communication antenna 221 may be connected to the mobile communication module 230 through the first switch 211 and the internal GPS antenna 223 may be connected to the GPS module 240 through the second switch 213.

The first switch 211 and the second switch 213 may be a unit for selective connection of one of the external antenna and the internal antenna. A control method of the first switch 211 and the second switch 213 will be described later in more detail with reference to subsequent drawings.

The mobile communication module 230 in accordance with the present inventive concept may support at least one wireless connection technology and attempt cell search according to a predetermined inside search priority algorithm. For example, if wireless connection technologies equipped in the mobile communication module 230 are GSM, WCDMA, and LTE technologies, the mobile communication module 230 may search cells in order of GSM, WCDMA, and LTE technologies.

Further, the mobile communication module 230 may be controlled so as to transmit/receive wireless signals through an antenna which may normally receive the signals, based on the signal receipt states of the internal/external antennas.

The GPS module 240 in accordance with the present inventive concept may be controlled so that the GPS antennas 201 and 223 which may form the 3D fixed state are connected to the GPS module 240 and thus the GPS module 240 may perform normal positioning.

Figure 3:
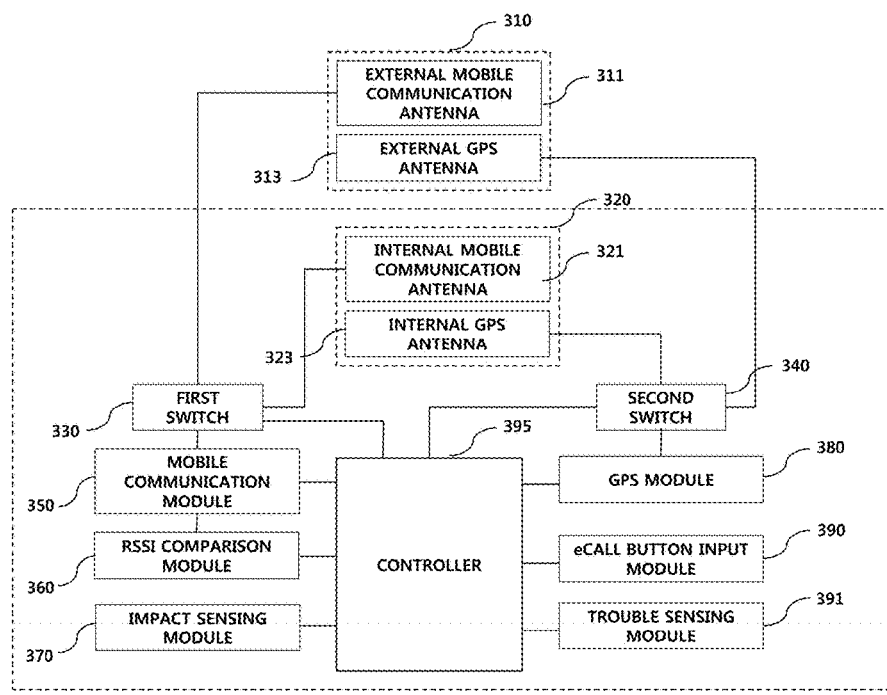
FIG. 3 is a block diagram illustrating an antenna control system for providing an emergency call service in a vehicle in accordance with one embodiment of the present inventive concept.

FIG. 3 is a block diagram illustrating an antenna control system for providing an emergency call service in a vehicle in accordance with one embodiment of the present invention.

With reference to FIG. 3, a vehicle antenna control system may include an external antenna 310, an internal antenna 320, first and second switches 330 and 340, a mobile communication module 350, an RSSI comparison module 360, an impact sensing module 370, a GPS module 380, an eCall button input module 390, a trouble sensing module 391, and a controller 395.

The external antenna 310 may include an external mobile communication antenna 311 and an external GPS antenna 313.

The internal antenna 320 may include an internal mobile communication antenna 321 and an internal GPS antenna 313.

In certain embodiments, the external mobile communication antenna 311 and the internal mobile communication antenna 321 are connected to the first switch 330, and the external GPS antenna 313 and the internal GPS antenna 323 are connected to the second switch 340.

The first switch 330 is connected to the mobile communication module 350 and the second switch 340 is connected to the GPS module 380. Here, the controller 395 may select antennas connected to the mobile communication module 350 and the GPS module 380 by controlling the first switch 330 and the second switch 340.

The RSSI comparison module 360 may judge whether or not received sensitivity is normal by comparing an RSSI of reference signals received from a mobile communication network through the mobile communication module 350, for example, pilot signals, with a designated reference value, and transmit a result of judgment to the controller 395.

The impact sensing module 370 may be operated in connection with impact sensors mounted at the outside/inside of the vehicle, judge that an accident occurs if the intensity of impact exceeds a designated reference value, and transmit a result of judgment to the controller 395.

Further, the impact sensing module 370 may deploy air bags according to the intensity of external impact. If the air bags are deployed, the impact sensing module 370 may transmit a signal indicating deployment of the air bags to the controller 395.

If an eCall button provided at one side of the inside of the vehicle is pressed by a driver, the eCall button input module 390 may sense pressing of the eCall button and transmit pressing of the eCall button to the controller 395. When the eCall button is pressed, the controller 395 may judge that an emergency occurs, set an emergency call channel, and transmit an emergent rescue request message to the rescue center 30 through the set emergency call channel. As another example, when the eCall button is pressed, the controller 395 may connect a voice call channel or a video call channel to the rescue center 30.

The trouble sensing module 391 has a function of judging whether or not the corresponding vehicle is out of order based on information sensed by various ECUs mounted in the vehicle and transmitting a result of judgment to the controller 395. Here, vehicle troubles may include troubles critical to vehicle safety, such as engine trouble, brake device trouble, tire trouble, headlight trouble, etc.

The GPS module 380 performs a function of calculating position information, including latitude/longitude/altitude information, by demodulating signals received by the external or internal GPS antenna and transmitting the calculated position information to the controller 395. Here, the controller 395 may judge whether or not a 3D fixed state is formed based on the position information received from the GPS module 380 and control GPS antenna switching according to a result of judgment. A GPS antenna diagnosis algorithm for GPS antenna switching may be repeated until the 3D fixed state is formed after a dead reckoning (DR) mode is activated. The DR mode is a mode in which an operation of estimating a current position using the formerly determined position is performed. Estimation of the current position may be performed based on the moving speed, wheel count, and moving direction of a vehicle which is driving now and an odometer, a magnetic compass, an accelerometer, a gyro sensor, etc., mounted in the vehicle. For example, the DR mode may be activated, if the 3D fixed state, i.e., a state in which position information is normally received, transitions to a non-3D fixed state, i.e., a state in which position information is not normally received, during driving. Here, a criterion for judgment of the 3D fixed state may be determined based on the rate of positioning signals normally received during a designated movement section for preventing a ping-pong situation. For example, if positioning signals of 70% or more are normally received during a movement section of 5 km, the 3D fixed state may be judged. On the other hand, if positioning signals of 30% or less are normally received during the movement section of 5 km, the non-3D fixed state may be judged. The above-described example is just one embodiment of the present invention, and various criteria for judgment of the 3D fixed state may be applied.

For example, a vehicle driving in a tunnel section or between high buildings downtown does not normally receive GPS signals. However, when the vehicle has passed by the tunnel section or deviated from the high buildings, the vehicle may normally receive GPS signals. If an excessively short section is applied to a judgment condition for DR mode conversion, the DR mode may be frequently activated and an inaccurate position due to estimation may be displayed on a navigation screen. Further, the frequent ping-pong situation between the DR mode and the normal positioning mode may cause overload or malfunction of a navigation system.

When the DR mode is activated, the controller 395 in accordance with the present inventive concept may confirm whether or not the external antenna is damaged through a hardware diagnosis unit provided therein. As a result of confirmation, if the external antenna is damaged, the controller 395 may judge whether or not the 3D fixed state is enabled by demodulating GPS signals received through the external antenna and control switching to the internal GPS antenna according to a result of judgment.

In accordance with one embodiment of the present invention, the controller 395 may trigger the eCall service function and thus execute a vehicle mobile communication antenna diagnosis algorithm, if occurrence of an emergency is sensed by the impact sensing module 370, the eCall button input module 390, and the trouble sensing module 391.

In accordance with another embodiment of the present invention, the controller 395 may forcibly activate the DR mode and thus execute a vehicle GPS antenna diagnosis algorithm, if occurrence of an emergency is sensed by the impact sensing module 370, the eCall button input module 390, and the trouble sensing module 391.

In accordance with another embodiment of the present invention, if a black box (not shown) is mounted on the accident vehicle 10, when the controller 395 senses an accident occurrence event, the controller 395 may read an accident image stored in the black box and transmit the read accident image to the rescue center 30 through the set emergency call channel, for example, a packet data channel.

The vehicle antenna diagnosis algorithm in accordance with the present inventive concept will be more clearly described below with reference to FIGS. 4 and 5.

Figure 4:
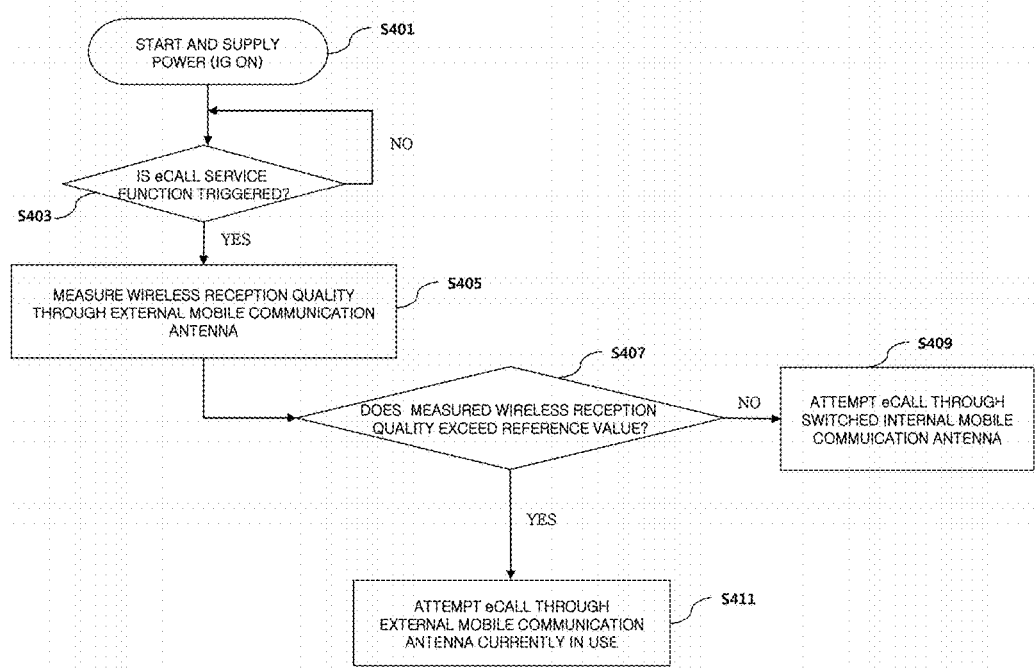
FIG. 4 is a flowchart illustrating a mobile communication antenna diagnosis algorithm in accordance with one embodiment of the present inventive concept.

FIG. 4 is a flowchart illustrating a mobile communication antenna diagnosis algorithm in accordance with one embodiment of the present invention.

When, after the vehicle is started and power is supplied (IG ON), a vehicle emergency is sensed and an eCall service function is triggered, a mobile communication module, i.e., a mobile communication modem, mounted in the vehicle is driven and the vehicle controller 395 may measure quality of wireless signals received through the external mobile communication antenna (Operations S401 to S405). Here, the quality of the received wireless signals (hereinafter, simply referred to as a wireless reception quality) may include an RSSI, a signal to noise ratio (SNR), a bit error rate (BER), a block error rate (BLEB), etc. of wireless signals received from the base station of the mobile communication network, and these values be mean values measured for a unit time.

The vehicle controller 395 compares the measured wireless reception quality with a designated reference value (Operation S407). For example, if the wireless reception quality is an RSSI, a reference value may be set to mean reception sensitivity of −120 dbm for 5 seconds.

As a result of comparison, if the measured wireless reception quality does not exceed the reference value, the vehicle controller 395 may switch from the external mobile communication antenna to the internal mobile communication antenna and attempt an eCall using the internal mobile communication antenna (Operation S409)

On the other hand, as a result of comparison, if the measured wireless reception quality exceeds the reference value, the vehicle controller 395 may attempt an eCall using the external mobile communication antenna which is currently in use (Operation S411).

Figure 5:
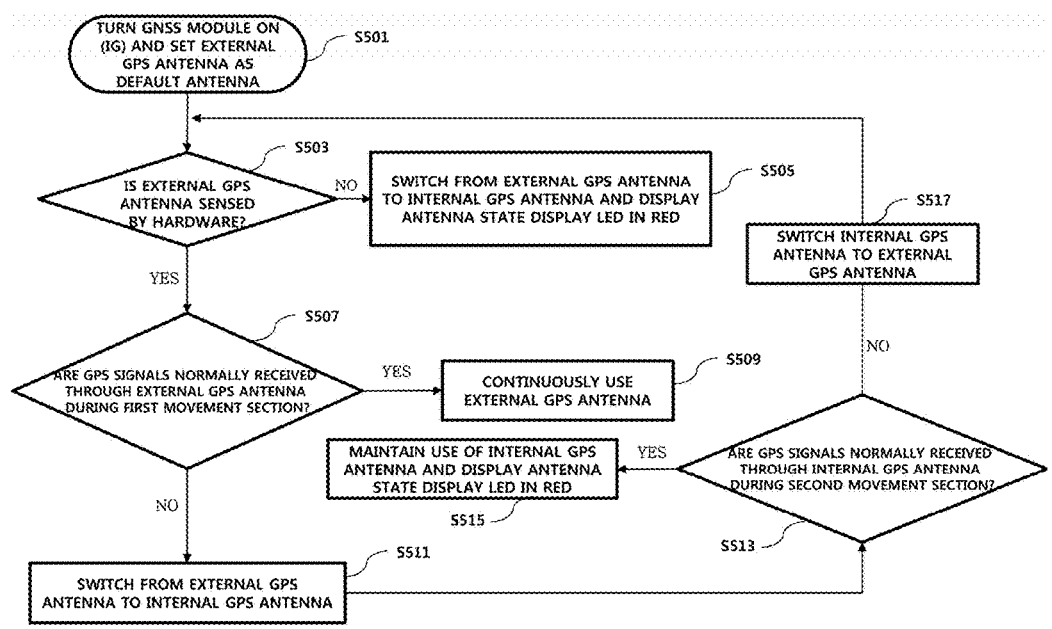
FIG. 5 is a flowchart illustrating a GPS antenna diagnosis algorithm in accordance with another embodiment of the present inventive concept.

FIG. 5 is a flowchart illustrating a GPS antenna diagnosis algorithm in accordance with another embodiment of the present invention.

With reference to FIG. 5, when the vehicle is started and power is supplied, the vehicle controller 395 sets an external GPS antenna as a default antenna and receives GPS signals through the external GPS antenna (Operation S501).

The vehicle controller 395 may activate the DR mode, if the GPS signals are not normally received through the external GPS antenna. As one example, the DR mode may be activated in a shaded section in which GPS signals are not received, such as an underground parking lot or a tunnel. As another example, the DR mode may also be activated if the external GPS antenna is damaged by vehicle collision, rollover, and breakdown.

In the activated state of the DR mode, the vehicle controller 395 confirms whether or not the external GPS antenna set as the default is normally operated by hardware through a sensor circuit provided therein (Operation S503). That is, the vehicle controller 395 may judge whether or not a cause of activation of the DR mode is a hardware defect of the external GPS antenna or location of the corresponding vehicle in a shaded area through hardware inspection through the sensor circuit.

As a result of confirmation, if the external GPS antenna is not normally operated by hardware, the vehicle controller 395 may perform switching to the internal GPS antenna and output an alarm signal indicating that the external GPS antenna is abnormally operated through an LED lamp or a display module provided in the vehicle.

On the other hand, as a result of confirmation of Operation S503, if the external GPS antenna is normally operated, the vehicle controller 395 judges whether or not position information is normally acquirable through the external GPS antenna during a designated first movement section (Operation S507). That is, the vehicle controller 395 judges whether or not the 3D fixed state is formed through the external GPS antenna. For example, the first movement section may be a movement distance of 10 km.

As a result of judgment, if the 3D fixed state is formed through the external GPS antenna, the vehicle controller 395 may control reception of GPS signals continuously using the external GPS antenna (Operation S509).

As a result of judgment of Operation S507, if the 3D fixed state is not formed through the external GPS antenna, the vehicle controller 395 performs switching to the internal GPS antenna and judges whether or not position information is normally acquirable through the internal GPS antenna during a second movement section (Operations S511 and S513). That is, the vehicle controller 395 may judge whether or not the 3D fixed state is formed through the internal GPS antenna. Here, the second movement section may be a movement distance of 3 km.

As a result of judgment, if the 3D fixed state is formed through the internal GPS antenna, the vehicle controller 395 may maintain use of the internal GPS antenna and output an alarm signal indicating that the external GPS antenna is abnormally operated through the LED lamp or the display module provided in the vehicle (Operation S515). For example, when the external GPS antenna is abnormally operated, an LED displaying the state of the external GPS antenna may be displayed in red.

As a result of judgment of Operation S513, if the 3D fixed state is not formed through the internal GPS antenna, the vehicle controller 395 may perform switching to the external GPS antenna (Operation S517) and then return to Operation S503.

In accordance with yet another embodiment of the present invention, as a result of judgment of Operation S513, if the 3D fixed state is not formed through the internal GPS antenna, the vehicle controller 395 may perform switching to the external GPS antenna (Operation S517) and then return to Operation S507.

As apparent from the above description, a method and apparatus in accordance with the present inventive concept will have effects, as follows.

First, the present inventive concept provides a method and apparatus for controlling antennas in a vehicle equipped with an external antenna and an internal antenna.

Second, the present inventive concept provides a method and apparatus for controlling antennas in a vehicle in which information regarding an accident occurrence position is effectively transmittable by selecting an optimum global positioning system (GPS) antenna through self-diagnosis of an external antenna and an internal antenna equipped in the vehicle when an emergent accident occurs.

Third, the present inventive concept provides a method and apparatus for controlling antennas in a vehicle which more rapidly and correctly informs peripheral vehicles and a rescue center of emergent situation by selecting an optimum wireless communication antenna based on wireless reception performance when an emergent accident occurs.

Fourth, the present inventive concept may minimize a vehicle accident response time.

It will be apparent to those skilled in the art that various modifications and variations can be made in the present inventive concept without departing from the spirit or scope of the invention. Thus, it is intended that the present inventive concept covers the modifications and variations of this inventive concept provided they come within the scope of the appended claims and their equivalents.

What is claimed is:

1. A method for controlling antennas in a vehicle having an external antenna and an internal antenna, the method comprising:

triggering an eCall service function upon sensing an accident occurrence event;

measuring a quality of wireless signal received through a mobile communication antenna of the external antenna;

judging whether or not position information through a GPS antenna of the external antenna is normally acquired;

performing the eCall service through a mobile communication antenna of the internal antenna when the measured quality of the wireless signal is less than a reference quality value;

acquiring current position information through the GPS antenna of the internal antenna when the normal acquisition of the position information through the GPS antenna of the external antenna is unavailable; and transmitting, by a rescue center, a warning message of an accident to approaching peripheral vehicles; and identifying, by the rescue center, an insurance company insuring the vehicle in the accident using vehicle information corresponding to the vehicle, wherein the triggering an eCall service function uses a eCall button provided at one side of a room mirror, wherein the warning message includes information regarding a position where the accident occurs and information regarding a traffic state around an area where the accident occurs, and wherein the judging whether or not position information through a GPS antenna of the external antenna is determined based on a rate of normally received positioning signals during a designated first movement section.

2. The method according to claim 1, wherein the accident occurrence event is generated when the intensity of impact applied to the exterior of the vehicle is greater than or equal to a reference impact intensity value.

3. The method according to claim 1, wherein the accident occurrence event is generated when trouble or malfunction is sensed by an electronic controller in the vehicle.

4. The method according to claim 1, wherein the accident occurrence event is generated when at least one air bag provided in the vehicle is deployed or an eCall button mounted in the vehicle is pressed.

5. The method according to claim 1, further comprising judging whether or not the current position information is normally acquirable through the GPS antenna of the internal antenna during a designated second movement section.

6. The method according to claim 1, wherein the measured quality of the one or more wireless signals is at least one of a received signal strength indicator (RSSI), a signal to noise ratio (SNR), a bit error rate (BER), and a block error rate (BLER) of wireless signals received from a base station of a mobile communication network.

7. The method according to claim 6, wherein the quality of the wireless signals is determined by averaging values periodically measured for a unit time.

8. The method according to claim 1, further comprising acquiring current position information of the vehicle through the one of the external antenna and the internal antenna selected, wherein the acquired current position information and vehicle information corresponding to the vehicle are transmitted to a rescue center by a text message.

9. The method according to claim 1, further comprising setting a call channel for the eCall service function, the call channel connected to a rescue center, wherein the call channel includes at least one of a voice call channel, a video call channel, and a packet data channel.

10. The method according to claim 5, wherein a distance of the designated second movement section is less than that of the designated first movement section.

11. The method according to claim 1, further comprising informing, by the rescue center, the identified insurance company of accident occurrence data.

* * * * *